United States Patent
Yoon et al.

(10) Patent No.: US 10,225,507 B2
(45) Date of Patent: Mar. 5, 2019

(54) DISPLAY SYSTEM, DISPLAY APPARATUS AND METHOD FOR CONTROLLING THE SAME

(71) Applicant: SAMSUNG ELECTRONICS CO., LTD., Suwon-si (KR)

(72) Inventors: Seung-il Yoon, Yongin-si (KR); Kwan-young Kim, Suwon-si (KR); Sergei Sudakov, Suwon-si (KR); Jae-min Soh, Suwon-si (KR); Ji-hyo Lee, Suwon-si (KR); Sang-jin Choi, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/394,917

(22) Filed: Dec. 30, 2016

(65) Prior Publication Data
US 2017/0195612 A1 Jul. 6, 2017

(30) Foreign Application Priority Data
Jan. 5, 2016 (KR) .......................... 10-2016-0001121

(51) Int. Cl.
*H04H 60/33* (2008.01)
*H04N 5/445* (2011.01)
(Continued)

(52) U.S. Cl.
CPC ....... *H04N 5/44582* (2013.01); *H04N 5/4403* (2013.01); *H04N 21/42204* (2013.01);
(Continued)

(58) Field of Classification Search
CPC ............ H04N 5/44582; H04N 5/4403; H04N 2005/4423; H04N 2005/4435;
(Continued)

(56) References Cited

U.S. PATENT DOCUMENTS

| | | | |
|---|---|---|---|
| 2004/0143847 | A1 | 7/2004 | Suzuki et al. |
| 2006/0158838 | A1 | 7/2006 | Kinoshita et al. |

(Continued)

FOREIGN PATENT DOCUMENTS

| | | |
|---|---|---|
| JP | 2008-78867 A | 4/2008 |
| JP | 2008-85703 A | 4/2008 |

(Continued)

OTHER PUBLICATIONS

Communication dated Mar. 15, 2017, issued by the European Patent Office in counterpart European Application No. 16207370.4.

(Continued)

*Primary Examiner* — James R Sheleheda
(74) *Attorney, Agent, or Firm* — Sughrue Mion, PLLC

(57) ABSTRACT

A display system is provided. The display system includes a display apparatus configured to display an image; an image providing apparatus configured to provide an image in response to receiving a control signal for controlling the image providing apparatus; and a remote control configured to transmit the control signal for controlling the image providing apparatus, wherein the display apparatus is further configured to receive the control signal transmitted by the remote control and the image provided by the image providing apparatus, and analyze the control signal and the image to obtain apparatus information of the image providing apparatus.

15 Claims, 10 Drawing Sheets

(51) Int. Cl.

| | |
|---|---|
| *H04N 5/44* | (2011.01) |
| *H04N 21/422* | (2011.01) |
| *H04N 21/431* | (2011.01) |
| *H04N 21/434* | (2011.01) |
| *H04N 21/436* | (2011.01) |
| *H04N 21/44* | (2011.01) |
| *H04N 21/482* | (2011.01) |
| *H04N 21/654* | (2011.01) |
| *H04N 21/658* | (2011.01) |
| *H04N 5/50* | (2006.01) |
| *H04N 21/462* | (2011.01) |
| *H04N 21/8358* | (2011.01) |

(52) U.S. Cl.
CPC ... *H04N 21/42226* (2013.01); *H04N 21/4312* (2013.01); *H04N 21/4345* (2013.01); *H04N 21/43615* (2013.01); *H04N 21/44008* (2013.01); *H04N 21/482* (2013.01); *H04N 21/654* (2013.01); *H04N 21/658* (2013.01); *H04N 5/50* (2013.01); *H04N 21/42208* (2013.01); *H04N 21/42225* (2013.01); *H04N 21/4622* (2013.01); *H04N 21/8358* (2013.01); *H04N 2005/4426* (2013.01); *H04N 2005/4435* (2013.01)

(58) Field of Classification Search
CPC ......... H04N 21/42219; H04N 21/4222; H04N 21/42204; H04N 21/42226
See application file for complete search history.

(56) References Cited

U.S. PATENT DOCUMENTS

| | | | |
|---|---|---|---|
| 2007/0268936 A1 | 11/2007 | Kim et al. | |
| 2007/0300188 A1 | 12/2007 | Kim | |
| 2008/0127253 A1* | 5/2008 | Zhang | H04N 21/478 |
| | | | 725/35 |
| 2012/0044051 A1* | 2/2012 | Chang | G06F 1/1626 |
| | | | 340/5.83 |
| 2013/0258207 A1* | 10/2013 | Kim | G08C 17/02 |
| | | | 348/734 |
| 2013/0271659 A1* | 10/2013 | Na | H04N 5/4403 |
| | | | 348/563 |
| 2015/0137959 A1* | 5/2015 | Kim | G08C 19/28 |
| | | | 340/12.28 |
| 2015/0179061 A1 | 6/2015 | Kim et al. | |
| 2015/0373393 A1* | 12/2015 | Lee | H04N 21/42203 |
| | | | 704/275 |
| 2016/0094868 A1* | 3/2016 | Singhal | H04N 21/44008 |
| | | | 725/38 |
| 2016/0353153 A1* | 12/2016 | Seidel | G11B 27/005 |
| 2017/0195609 A1* | 7/2017 | Kim | G06F 3/0346 |
| 2017/0195611 A1* | 7/2017 | Yoon | H04N 21/25841 |
| 2017/0195612 A1* | 7/2017 | Yoon | H04N 21/42204 |
| 2017/0264949 A1* | 9/2017 | Yu | G06F 3/0416 |
| 2017/0272683 A1* | 9/2017 | Park | H04N 21/44008 |
| 2017/0310905 A1* | 10/2017 | Gopinath | H04N 5/765 |

FOREIGN PATENT DOCUMENTS

| | | |
|---|---|---|
| KR | 10-2004-0081776 A | 9/2004 |
| KR | 10-2005-0075586 A | 7/2005 |
| KR | 10-0705161 B1 | 4/2007 |
| KR | 10-0722025 B1 | 5/2007 |
| KR | 10-0765789 B1 | 10/2007 |
| KR | 10-2007-0112596 A | 11/2007 |
| KR | 10-2009-0032229 A | 4/2009 |
| WO | 2015/072665 A1 | 5/2015 |

OTHER PUBLICATIONS

International Search Report (PCT/ISA/210) dated Mar. 20, 2017 issued by the International Searching Authority in counterpart International Application No. PCT/KR2017/000009.

Written Opinion (PCT/ISA/237) dated Mar. 20, 2017 issued by the International Searching Authority in counterpart International Application No. PCT/KR2017/000009.

Communication dated Sep. 6, 2017, issued by the European Patent Office in counterpart European Application No. 16207370.4.

Communication dated Apr. 3, 2018, issued by the European Patent Office in counterpart European Patent Application No. 16207370.4.

* cited by examiner

DISPLAY SYSTEM, DISPLAY APPARATUS AND METHOD FOR CONTROLLING THE SAME

CROSS-REFERENCE TO RELATED APPLICATIONS

This application claims priority from Korean Patent Application No. 10-2016-0001121, filed on Jan. 5, 2016 in the Korean Intellectual Property Office, the disclosure of which is incorporated herein by reference in its entirety.

BACKGROUND

1. Field

Apparatuses and methods consistent with exemplary embodiments relate to controlling the same, and more particularly, to a display apparatus capable of obtaining apparatus information on an external apparatus, a method for controlling the same, and a display system including the display apparatus.

2. Description of the Related Art

With the advancement of digital display technology, it has become possible to connect various external electronic devices that provide video content, such as a set-top box, a digital versatile disc (DVD) player, an audio, and the like, to a display apparatus such as a television.

Accordingly, multiple external electronic devices that serve as image sources may be connected to the display apparatus, and a user may switch among the numerous connected devices.

However, a related art display apparatus may not be able to recognize the exact type or manufacturer of the image source and may simply indicate the source names corresponding to the external electronic devices by the input ports through which the image sources are connected, such as High-Definition Multimedia Interface (HDMI) 1, HDMI 2, video graphics array (VGA), composite, etc. Thus, the user may have difficulty identifying which electronic device corresponds which port. For example, if the user wants to select the set-top box, the user needs to know whether the set-top box is connected to HDMI 1 or HDMI 2.

Accordingly, there exists a need to provide to the user more comprehensive and intuitive information about the external electronic devices connected to the display apparatus.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

Exemplary embodiments provide a display apparatus capable of obtaining apparatus information on an external apparatus, a method for controlling the same, and a display system including the display apparatus.

According to an aspect of an exemplary embodiment, a display system includes a display apparatus configured to display an image; an image providing apparatus configured to provide an image in response to receiving a control signal for controlling the image providing apparatus; and a remote control configured to transmit the control signal for controlling the image providing apparatus, wherein the display apparatus is further configured to receive the control signal transmitted by the remote control and the image provided by the image providing apparatus, and analyze the control signal and the image to obtain apparatus information of the image providing apparatus.

According an aspect of another exemplary embodiment, a display apparatus includes a communicator configured to receive, from a remote control, a control signal for controlling an image providing apparatus, and receive an image provided by the image providing apparatus in response to the image providing apparatus receiving the control signal; a display configured to display the received image; and a processor configured to obtain apparatus information of the image providing apparatus based on the control signal and the image.

According to an aspect of another exemplary embodiment, a method for controlling a display apparatus includes receiving, by the display apparatus, a control signal for controlling an image providing apparatus transmitted by a remote control; and obtaining apparatus information of the image providing apparatus based on the control signal and an image that is provided by the image providing apparatus in response to the image providing apparatus receiving the control signal transmitted by the remote control.

According to an aspect of another exemplary embodiment, a computer-readable recording medium including a program for performing the method for controlling a display apparatus is provided.

According to an aspect of another exemplary embodiment, there is provided a non-transitory computer-readable storage medium storing instructions which, when executed by a processor, cause the processor to perform operations comprising: receiving, at a first time by a display device, a first image from an image output device connected to the display device, receiving, at a second time after the first time and by the display device, a control signal for controlling the image output device, receiving, at a third time after the second time and by the display device, a second image from the image output device, comparing, by the display device, the first image and the second image to identify a difference between the first image and the second image, and determining, by the display device, a device type of the image output device based on the control signal and the difference between the first image and the second image.

The image output device may be one of a digital versatile disc (DVD) player, a Blu-disc player, a digital video recorder (DVR), a set-top box, a home theater system, and an over-the-top (OTT) device.

The difference between the first image and the second image may comprise a change in at least one of a volume, a channel, a broadcast network, an image source, a user interface element.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Figure 1:
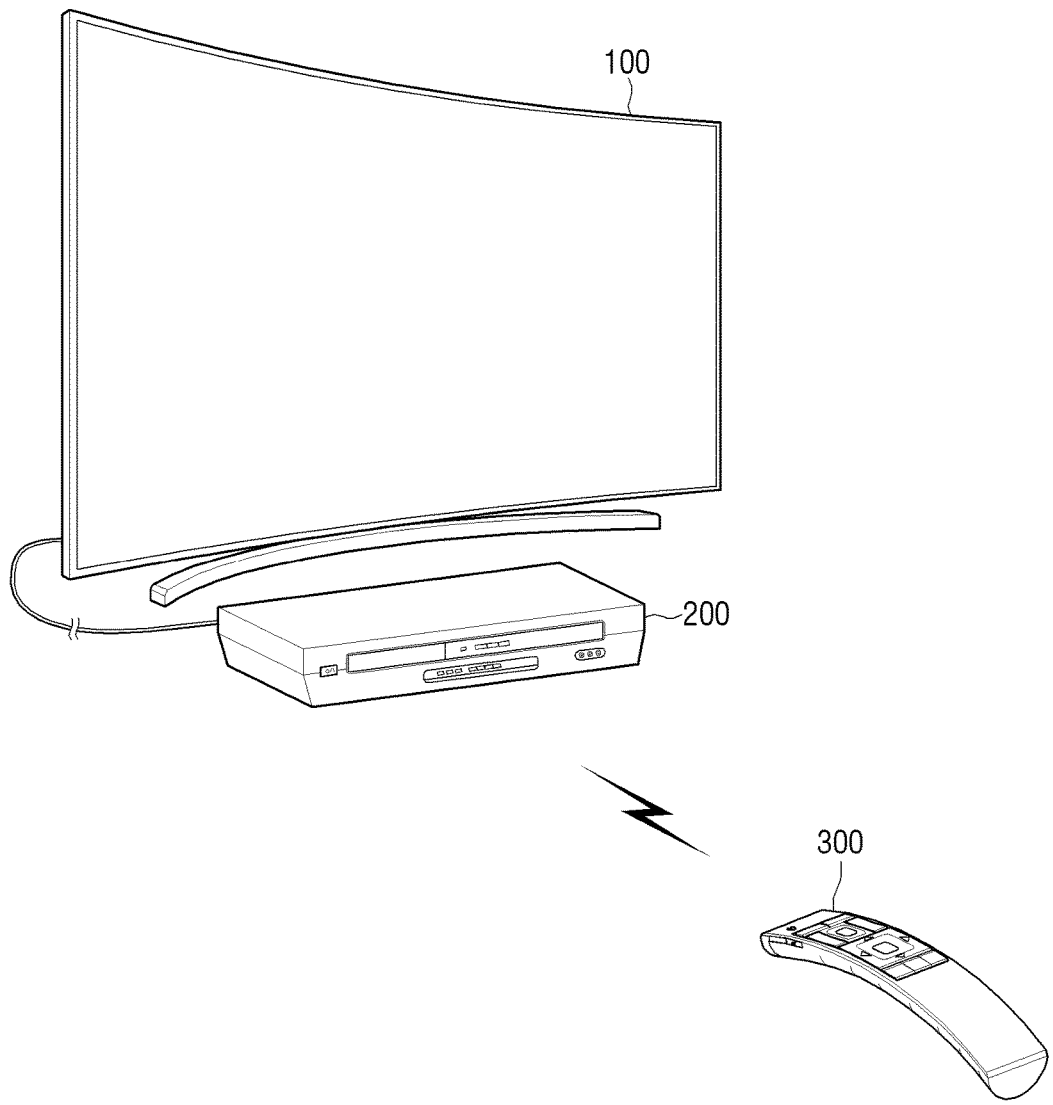
FIG. 1 is a diagram illustrating a display system according to an exemplary embodiment.

Before specifically describing the present disclosure, a method for demonstrating the present specification and drawings will be described.

First, as terms used in the present specification and claims, general terms have been selected by considering functions in diverse exemplary embodiments of the present disclosure. However, such terms may be varied depending on an intention of those skilled in the art, a regal or technical interpretation, an emergence of a new technology, and the like. Further, some terms may be terms which are arbitrarily selected by an applicant. Such terms may be interpreted as meanings defined in the present specification, and may also be interpreted based on general contents of the present specification and a typical technical concept in the art unless the terms are not specifically defined.

Further, the same reference numerals or symbols described in the accompanying drawings of the present specification denote parts or components that perform substantially the same function. For convenience of explanation and understanding, the description will be provided using the same reference numerals or symbols in different exemplary embodiments. That is, although a plurality of drawings illustrate all of the components having the same reference numeral, the plurality of drawings do not mean one exemplary embodiment.

In addition, in order to distinguish between the components, terms including an ordinal number such as "first," "second," etc. may be used in the present specification and claims. The ordinal number is used to distinguish the same or similar components from each other, and the meaning of the terms should not be interpreted as being limited due to the usage of the above-mentioned ordinal number. As an example, the components coupled to the ordinal number should not be interpreted as a use order, a layout order, or the like being limited by the number. The respective ordinal numbers are interchangeably used, if necessary.

In the present specification, the singular expression includes the plural expression unless the context clearly indicates otherwise. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

A term "module," "unit," "part," or the like, in the exemplary embodiment is a term for referring to the component performing at least one function or operation, and such component may be implemented in hardware or software or a combination of hardware and software. In addition, a plurality of "modules," "units," "parts," or the like may be integrated into at least one module or chip and may be implemented in at least one processor, except for a case in which they need to be each implemented in individual specific hardware.

In addition, in the exemplary embodiment, it will be understood that when an element is referred to as being "connected to" another element, it can be directly "connected to" the other element or other elements intervening therebetween may be present. In addition, unless explicitly described otherwise, "comprising" any components will be understood to imply the inclusion of other components but not the exclusion of any other components.

Hereinafter, the present disclosure will be described in detail with reference to the accompanying drawings.

FIG. 1 is a diagram illustrating a display system according to an exemplary embodiment.

As shown in FIG. 1, the display system 1000 includes a display apparatus 100, an image providing apparatus 200, and a remote control 300.

The display apparatus 100 may be a television (TV) as illustrated in FIG. 1, but that is merely one example. The display apparatus 100 may be implemented as various apparatuses such as a smart phone, a tablet personal computer (PC), a desktop PC, a projector, and the like.

The image providing apparatus 200 may provide an image to the display apparatus 100. As illustrated in FIG. 1, the image providing apparatus 200 may be wired-connected to the display apparatus 100. For example, the image providing apparatus 200 may provide the image through an High-Definition Multimedia Interface (HDMI) port of the display apparatus 100. However, the image providing apparatus 200 is not limited thereto, but may also be implemented to provide the image the display apparatus 100 by performing wireless communication.

The image providing apparatus 200 may be implemented as various kinds of apparatuses such as a digital versatile disc (DVD) player, a Blue-ray disc player, a PC, a Universal Serial Bus (USB) device, a video game console, a home theater system, an audio player, a set-top box, an over-the-air (OTA) antenna, an over-the-top (OTT) device, and the like.

The remote control 300 may be implemented as various kinds of apparatuses that may transmit control signals for controlling other apparatuses. For example, the remote control 300 may be a dedicated remote control that is able to only control a specific apparatus, or be a multi-brand remote (MBR) which is able to control several apparatuses (otherwise known as a universal remote control), and may be a portable device such as a smartphone, a personal digital assistant (PDA), or the like.

The remote control 300 may include a direction key button, a number key button, a menu button, a touch pad, and the like. The remote control 300 may generate various control signals corresponding to the direction key button, the touch pad, and other buttons.

The display apparatus 100 may perform an analysis for the image provided from the image providing apparatus 200 in order to obtain apparatus information of the image providing apparatus 200, and may perform various operations using the obtained apparatus information. As an example, the display apparatus 100 may perform a multi-brand remote setting for the remote control 300 so that the remote control 300 may control the image providing apparatus 200 using the obtained apparatus information of the image providing apparatus 200.

As another example, the display apparatus 100 may update an apparatus name of the image providing apparatus 200 in the display apparatus 100 based on the obtained apparatus information of the image providing apparatus 200.

Hereinafter, the display apparatus 100 in the display system 1000 described above will be described in more detail.

Figure 2:
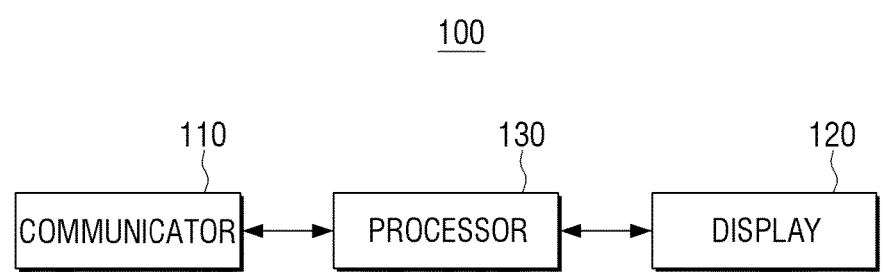
FIG. 2 is a block diagram illustrating a configuration of a display apparatus according to an exemplary embodiment.

FIG. 2 is a diagram illustrating the display apparatus 100 according to an exemplary embodiment.

As shown in FIG. 2, the display apparatus 100 may include a communicator 110, a display 120, and a processor 130.

The communicator 110 is a component for performing wireless or wired communication with a variety of external devices. Specifically, the communicator 110 may include input/output ports for a wired connection with the external device, and various communication chips such as a Wi-Fi chip, a Bluetooth chip, an near-field communication (NFC) chip, a wireless communication chip, and the like for performing wireless communication.

The communicator 110 may communicate with the image providing apparatus 200 to receive the image from the image providing apparatus 200. In addition, the communicator 110 may transmit a control command allowing the remote control 300 to transmit a specific control signal to the remote control 300. According to an aspect of an exemplary embodiment, the communicator 110 may receive the control signal transmitted from the remote control 330 to control the image providing apparatus 200.

The display 120 is a component for displaying various screens according to a control of the processor 130.

The display 120 may be, for example, implemented as a liquid crystal display (LCD), a cathode-ray tube (CRT), a plasma display panel (PDP), an organic light emitting diode (OLED) display, a transparent OLED (TOLED) display, or the like. In addition, the display 120 may also be implemented in a form of a touch screen capable of sensing a touch manipulation of a user.

The display 120 may display the image provided from the image providing apparatus 200. In addition, the display 120 may display various user interface (UI) screens which are prestored.

The processor 130 is a component for controlling an overall operation of the display apparatus 100.

For example, the processor 130 may include a central processing unit (CPU), a random access memory (RAM), a read-only memory (ROM), and a system bus. Here, the ROM is a component in which an instruction set for booting a system is stored, and the CPU copies an operating system (OS) stored in a storage of the display apparatus 100 to the RAM according to an instruction stored in the ROM, and executes the operating system (OS) to thereby boot the system. When the booting is completed, the CPU copies a variety of applications stored in the storage to the RAM, and executes the applications, thereby making it possible to perform a variety of operations. Hereinabove, although the case in which processor 130 includes only one CPU is described, the processor 130 may be implemented by a plurality of CPUs (or digital signal processor (DSP), system on chip (SoC), etc.) at the time of being implemented.

In particular, the processor 130 may acquire the apparatus information of the image providing apparatus 200 in cooperation with the remote control 300. Specifically, in the case in which the remote control 300 is a dedicated remote control (hereinafter, referred to as a first remote control 300') of the image providing apparatus 200, the apparatus information may be obtained according to exemplary embodiments to be described below.

Figure 3:
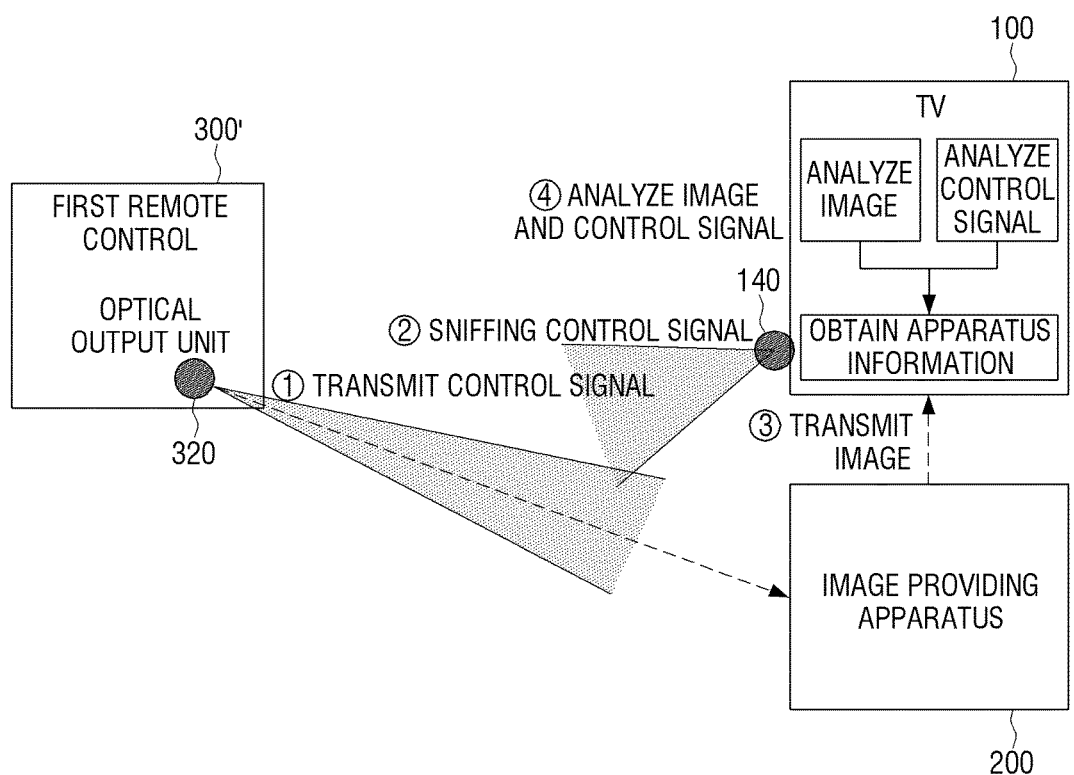
FIG. 3 is a diagram illustrating a method for obtaining apparatus information of an image providing apparatus by the display apparatus according to an exemplary embodiment.

FIG. 3 is a diagram illustrating a method for obtaining apparatus information of an image providing apparatus 200 by the display apparatus 100 according to an exemplary embodiment. Here, the display apparatus 100 may include an optical receiver 140 in addition to the communicator 110, the display 120, and the processor 130. The optical receiver 140 may receive an optical control signal which is output and transmitted from an optical output unit 320 of the first remote control 300' through an optical window.

The first remote control 300' may transmit the optical control signal through the optical output unit 320. In this case, the optical output unit 320 may include an infrared-light emitting diode (IR-LED), and may generate an IR control signal according to a control of a processor of the first remote control 300'.

First, when the user presses down any key of the first remote control 300' to transmit a control signal for controlling the image providing apparatus 200 (①), the display apparatus 100 may receive the control signal through an optical receiving unit 140 (②). This is referred to as IR sniffing.

In addition, the image providing apparatus 200 may receive the control signal, and transmit the image to the display apparatus 100 according to the received control signal (③).

The display apparatus may also receive the control signal, and if an image change is sensed with respect to the image provided from the image providing apparatus 200, the received control signal and a current image may be analyzed (④).

Specifically, the processor 130 may identify the received control signal based on a waveform of the control signal. In addition, the processor 130 may detect a control command corresponding to the control signal through the image analysis in which images before and after the reception of the control signal are compared. This will be described in more detail with reference to FIG. 4.

Figure 4:
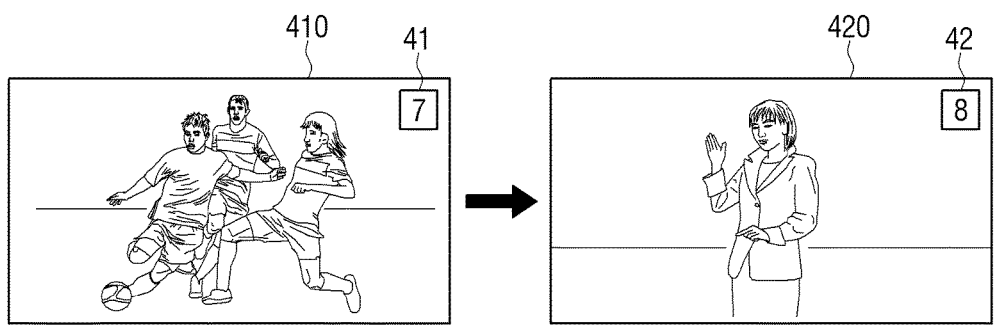
FIG. 4 is a diagram illustrating an image change sensing of the display apparatus according to an exemplary embodiment.

FIG. 4 is a diagram illustrating an example in which the display apparatus 100 determines the control command corresponding to the received control signal based on the image change.

As shown in FIG. 4, a first image 410 is an image before the display apparatus 100 receives the control signal for controlling the image providing apparatus 200 from the first remote control 300', and a second image 420 is an image after the display apparatus 100 receives the control signal.

The processor 130 of the display apparatus 100 may compare the first image 410 with the second image 420 and determine that the control command corresponding to the control signal is the control command for performing a channel-up. Specifically, the processor 130 may extract a channel number region 41 of the first image 410, extract a channel number region 42 of the second image 420, and recognize channel numbers of the extracted regions through optical character recognition (OCR), to thereby determine that the channel number has changed from the number of 7 to the number of 8 and determine that the control command corresponds to performing the channel-up.

According to an aspect of an exemplary embodiment, the processor 130 may extract characteristics information of the first image 410 and the second image 420, and transmit the extracted characteristics information to an external server capable of recognizing the image based on the characteristics information of the image. In addition, the processor 130 may receive channel information corresponding to the first image 410 and channel information corresponding to the second image 420 to thereby determine that the channel-up is performed. Here, the characteristics information transmitted to the external server may be a water mark or a digital fingerprint, which is identity information of the image.

According to an aspect of an exemplary embodiment, the processor 130 may compare the images before receiving the control signal and after receiving the control signal, and may determine that the control command corresponding to the control signal is a command for volume control when it is recognized that a graphical object or a volume control on-screen display (OSD) element indicating that a volume is changed appears in the image after receiving the control signal.

Using various known image analysis technologies in addition to the methods described above, the processor 130 may determine which control command corresponds to the received control signal.

In addition, the processor 130 may obtain the apparatus information of the image providing apparatus 200 based on the determined control command and the received control signal. Specifically, the display apparatus 100 may store a plurality of control code sets corresponding to the image providing apparatuses of known manufacturers, and the processor 130 may detect a matching control code set for the received control signal and the determined control command among the plurality of preloaded control code sets to thereby obtain the apparatus information of the image providing apparatus 200. Meanwhile, although the control code sets of the respective manufacturers may be preloaded in the display apparatus 100 is described, the display apparatus 100 may also receive the control code sets of the respective manufacturers from an external server, if needed.

Meanwhile, even for devices designed by different manufacturers, the control signals corresponding to a specific control command may be identical to each other. For example, if a control signal for a channel-up operation in a control code set of manufacturer A and a control signal for a channel-up operation in a control code set of manufacturer B are identical to each other, it may be difficult for the display apparatus 100 to correctly identify the manufacturer of the image providing apparatus 200 by information obtained through the control signal analysis and the image change analysis alone.

Therefore, according to an aspect of an exemplary embodiment, if the image provided from the image providing apparatus 200 includes content capable of specifying the image providing apparatus 200, the apparatus information of the image providing apparatus 200 may be obtained through the image analysis.

For example, the processor 130 may sense a manufacturer's logo of the image providing apparatus 200 from the image provided by the image providing apparatus 200, and may obtain the apparatus information of the image providing apparatus 200 based on the sensed manufacturer logo. However, the method based on the logo recognition is merely one example, and any image may be used as long as the image includes the contents from which the apparatus information of the image providing apparatus 200 may be recognized through the image analysis.

As one example, obtaining the apparatus information through the logo will be described below in more detail with reference to FIG. 5.

Figure 5:
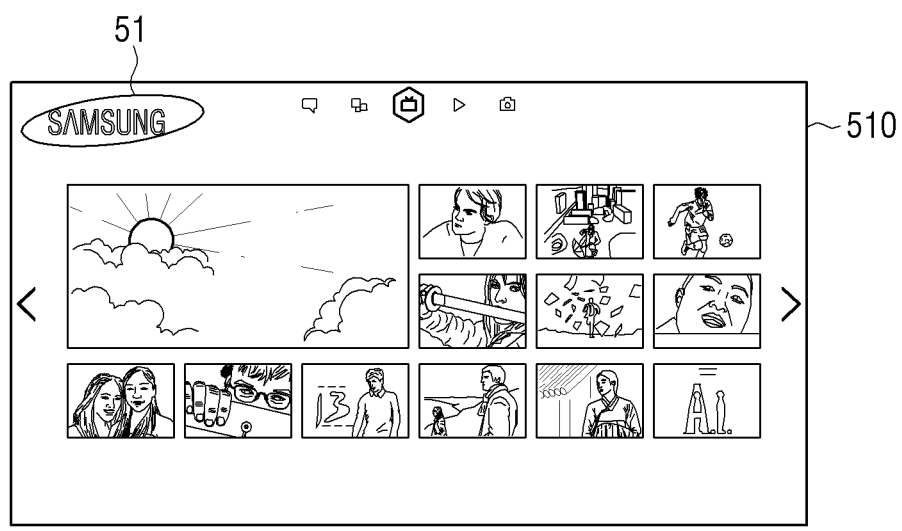
FIGS. 5 and 6 are diagrams illustrating a method for analyzing an image of the display apparatus according to various exemplary embodiments.

FIG. 5 illustrates one example of the image provided by the image providing apparatus 200.

As shown in FIG. 5, an image 510 of the image providing apparatus 200 provided to the display apparatus 100 according to the control signal transmitted from the first remote control 300' may include a logo 51. The processor 130 may sense whether the logo 51 corresponds to any manufacturer's logo, based on the known logos of manufacturers which may be preloaded in the display apparatus 100. Therefore, the processor 130 may obtain the apparatus information of the image providing apparatus 200.

As another example, the processor 130 may sense the channel number and the broadcast logo within the image provided by the image providing apparatus 200 to thereby obtain the apparatus information of the image providing apparatus 200.

Specifically, if the image providing apparatus 200 is a set-top box, even though the channel number is identical for each of the manufacturer of the set-top box, images of different broadcasting stations are provided. For example, it is assumed that a channel 1 in the set-top box of a company A corresponds to CBS, and a channel 1 in the set-top box of a company B corresponds to NBC. The processor 130 may analyze the image provided from the image providing apparatus 200 to determine that the image providing apparatus 200 is the set-top box of the company A when the channel number is 1 and the sensed broadcast logo is CBS, and to determine that the image providing apparatus 200 is the set-top box of the company B when the channel number is 1 and the sensed broadcast logo is NBC. This will be described in more detail with reference to FIG. 6. In addition, a database of various UI elements, fonts, images, etc. that are tied to known manufacturers may be used to identify the specific manufacturer of the image providing apparatus 200. Moreover, a placement of these elements within the screen may also provide clues for determining the manufacturer.

Figure 6:
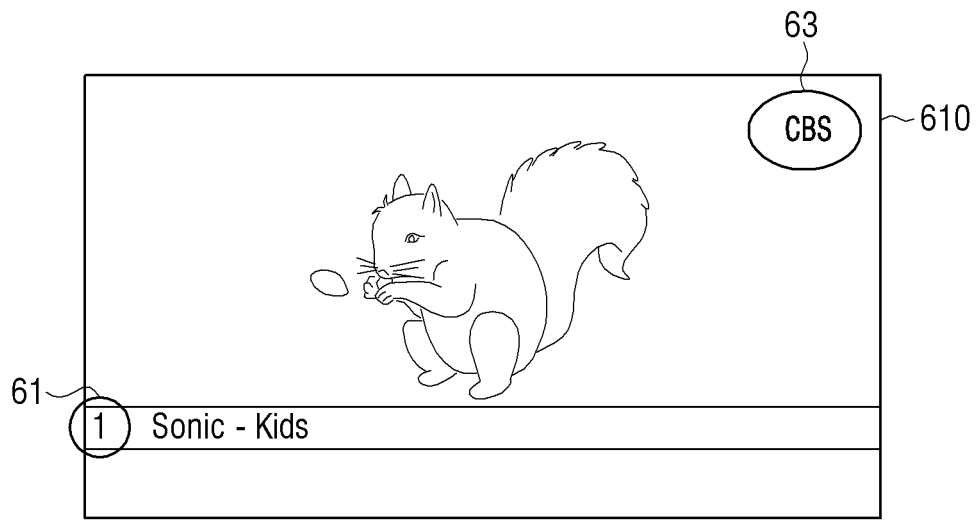

FIG. 6 illustrates one example of a specific channel image provided from the image providing apparatus 200.

As shown in FIG. 6, a specific channel image 610 of the image providing apparatus 200 provided to the display apparatus 100 includes a channel number 61 and a channel logo 63. The processor 130 may sense whether the logo 63 corresponds to any specific broadcast network's logo, based on the logos of the manufacturers and broadcast networks which are preloaded in the display apparatus 100. In addition, the processor 130 may recognize the number of the channel number 61 through a character recognition method such as optical character recognition (OCR), or the like. Therefore, the processor 130 may detect that a manufacturer of the image providing apparatus 200 is a manufacturer that associates the channel number 61 to the logo 63. As a result, the processor 130 may obtain the apparatus information of the image providing apparatus 200.

That is, as such, after the processor 130 receives the control signal for controlling the image providing apparatus 200 from the first remote control 300', when the image is provided from the image providing apparatus 200 and a change is sensed in a current image, the processor may obtain the apparatus information of the image providing apparatus 200 by analyzing the changed image.

Meanwhile, if the image analysis technology as described above returns more than one matching results, recognition accuracy of the logo or the channel number may decrease, and it may be difficult to pinpoint any one manufacturer.

Therefore, in this case, if the method for analyzing the control signal and the image change, and the method for analyzing the contents indicating the manufacturer within the image are simultaneously used, the apparatus information of the image providing apparatus 200 may be more accurately obtained. That is, the processor 130 may receive the control signal transmitted from the first remote control 300', determine the control command corresponding to the control signal through the image changed to correspond to the control signal, and sense a specific object such as the logo or the channel number within the image provided from the image providing apparatus 200, to thereby finally obtain the apparatus information of the image providing apparatus 200.

As such, the display apparatus 100 may autonomously obtain the apparatus information of the image providing apparatus 200. Alternatively, the display apparatus 100 may obtain the apparatus information of the image providing apparatus 200 by means of the server. Specifically, the processor 130 of the display apparatus 100 may transmit the determined control command and control signal to the server to thereby control the communicator 110 to receive the apparatus information of the image providing apparatus 200 from the server. In addition, the display apparatus 100 may receive data required to analyze the image, for example, information on the logo of the manufacturer, or the like, from the server.

Meanwhile, the data for obtaining the apparatus information of the image providing apparatus 200 through the image analysis, for example, the logo for each of the manufacturers, or the like, may be stored in the display apparatus 100, or may be stored in the external server. In the case in which the data is stored in the external server, the display apparatus 100 may transmit the image provided from the image providing apparatus 200 to the external server to thereby obtain the apparatus information of the image providing apparatus 200 from the external server, or receive the data from the external server, if needed. Meanwhile, if the display apparatus 100 fails to obtain the apparatus information, the display apparatus 100 may transmit the failure result to the external server to thereby receive additional data from the external server and update the data of the display apparatus 100, and the external server may perform a supplementary task so that an accurate image recognition may be performed, based on the failure result.

Meanwhile, the processing for obtaining the apparatus information of the image providing apparatus 200 as described above may be initiated on condition that the image providing apparatus 200 is newly discovered and the control signal for controlling the image providing apparatus 200 is received. Therefore, because the processing for obtaining the apparatus information is performed only when the control signal is received, a waste of a memory may be reduced. Meanwhile, newly discovering the image providing apparatus 200 may mean that a new image providing apparatus 200 is sensed by the display apparatus 100, and may specifically mean that the new image providing apparatus 200 is connected to an input port of the display apparatus 100.

As described above, if the display apparatus 100 obtains the apparatus information of the image providing apparatus 200 in cooperation with the first remote control 300', it is possible to control the image providing apparatus 200 using another remote control (hereinafter, referred to as a second remote control) instead of the dedicated remote control of the image providing apparatus 200.

Specifically, the display apparatus 100 may control the communicator 110 so as to transmit the control code set corresponding to the obtained apparatus information to the second remote control. In this example, the second remote control is an apparatus that may perform wireless communication such as Bluetooth, and the display apparatus 100 may transmit the control code set via a wireless communication scheme such as Bluetooth through the communicator 110. In addition, the second remote control may control the image providing apparatus 200 using the received control code set.

According to an aspect of an exemplary embodiment, the display apparatus 100 may store information regarding a correspondence relationship between a button of the first remote control and the control code for controlling the image providing apparatus 200. Therefore, a first control signal generated from the second remote control may be converted into a second control signal that is suitable for the control of the image providing apparatus 200. Specifically, if the user selects a specific button in the second remote control, the second remote control transmits the first control signal corresponding to the selected button. The display apparatus 100 receives the first control signal, and transmits a command transmitting the first received control signal and the second control signal corresponding to the apparatus information of the image providing apparatus 200 to the second remote control. In addition, the second remote control may control the image providing apparatus 200 by transmitting the second control signal according to the command received from the display apparatus 100.

In this scheme, the second remote control may be operated as a multi-brand remote (i.e., universal remote control) capable of controlling various image providing apparatuses. In particular, if the second remote control is a remote control capable of controlling the display apparatus 100, it may be more convenient for the user because the user may control the image providing apparatus 200 as well as the display apparatus 100 using only the second remote control instead of having to use multiple remote controls.

Meanwhile, when the apparatus information of the image providing apparatus 200 is obtained, the display apparatus 100 may display a UI screen informing the user that the second remote control may be used instead of the first remote control 300'. This will be described below with reference to FIG. 7.

Figure 7:
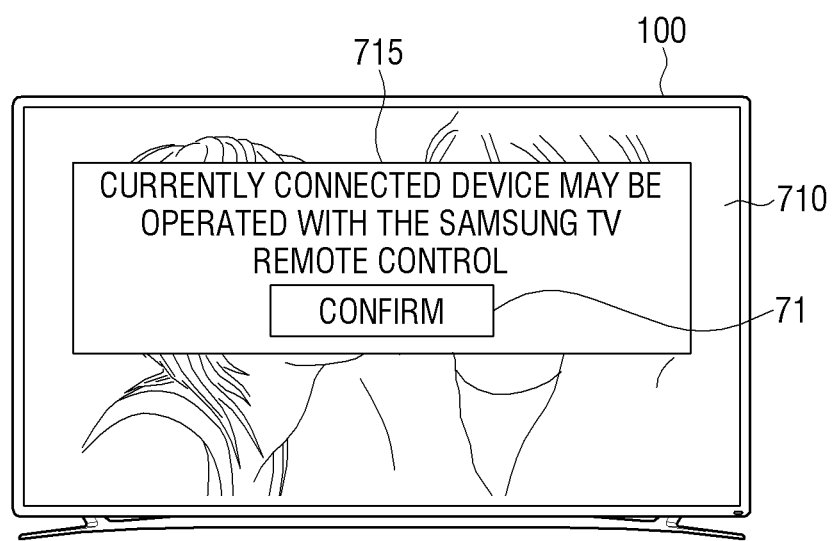
FIG. 7 is a diagram illustrating one example a graphical user interface (UI) screen provided from the display apparatus.

FIG. 7 illustrates one example of the UI screen displayed by the display apparatus 100 according to an exemplary embodiment.

A shown in FIG. 7, when the apparatus information of the image providing apparatus 200 is obtained, the display apparatus 100 may display a notification UI 715 informing that the image providing apparatus 200 may be controlled by the remote control of the display apparatus 100 (i.e., the second remote control). For example, as illustrated in FIG. 7, the notification UI 715 may be displayed on top of an image 710 provided from the image providing apparatus 200, which is a current image providing source. Such notification UI 715 may be removed by selecting a confirmation button 71.

Alternatively, the notification UI 715 may also be provided to have a relatively small size within the screen so as not to disturb a viewing of the current image 710, and may be set so that the notification UI 715 automatically disappears after a predetermined time lapses.

According to an aspect of an exemplary embodiment, the display apparatus 100 may transmit the control command for generating the screen such as the notification UI 715 to the second remote control via the wireless communication scheme such as Bluetooth. Accordingly, the screen such as the notification UI 715 may be displayed on a display included in the second remote control. Therefore, the user may be provided with the notification UI 715 from the second remote control without covering the screen of the display apparatus 100.

Alternatively, the display apparatus 100 may transmit a control command outputting a voice informing that the second remote control may control the image providing apparatus 200 to the second remote control. Accordingly, such information may also be output as the voice through a speaker included in the second remote control.

According to the exemplary embodiment described above, because the user does not need to manually input the apparatus information of the image providing apparatus 200 to the display apparatus 100 as in the related art in order to use the second remote control as the multi-brand remote, and it is possible to appropriately inform the user that the second remote control may be used as the multi-brand remote, utilization of the second remote control as the multi-brand remote may be increased.

Meanwhile, the apparatus information of the image providing apparatus 200 obtained by the display apparatus 100 may be used for a multi-brand remote setting of the second remote control, and may also be utilized for a source name update of the image providing apparatus 200 in the display apparatus 100. This will be described with reference to FIG. 8.

Figure 8:
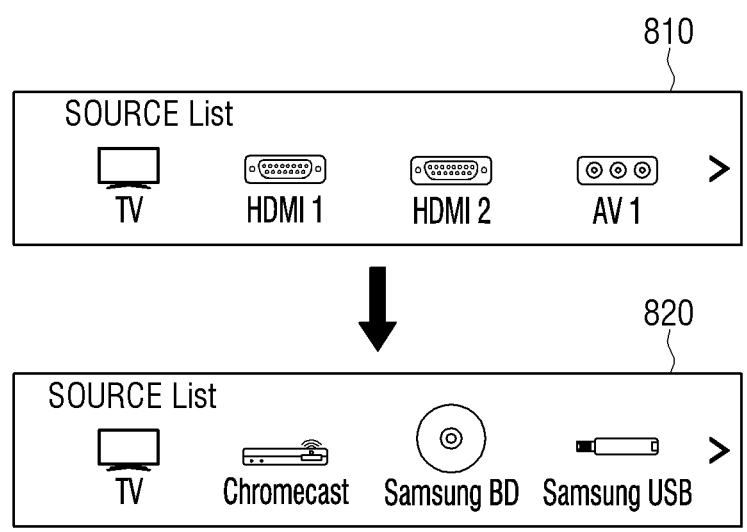
FIG. 8 is a diagram illustrating a source list providing of the display apparatus according to an exemplary embodiment.

FIG. 8 is a diagram illustrating one example of utilization of the obtained apparatus information of the image providing apparatus 200.

FIG. 8, which illustrates source lists provided by the display apparatus 100, is a diagram comparing a source list 810 before the apparatus information of the image providing apparatus 200 is obtained and a source list 820 after the apparatus information thereof is obtained. Meanwhile, such source lists may be displayed on the display 120 according to the user command through the remote control 300.

Specifically, if the processor 130 obtains the apparatus information of the image providing apparatus 200 as in the exemplary embodiments described above, the processor 130 may update a source name corresponding to the image providing apparatus 200 using the obtained apparatus information of the image providing apparatus 200.

As shown in FIG. 8, before the apparatus information is obtained, a source list 810 may include port names (HDMI1, HDMI 2, AV1, etc.) of the sources before the update may be provided from the display apparatus 100. After the apparatus information is obtained, the source name may get updated such that a list including manufacturer information (e.g., Samsung, Chromecast, etc.) such as the updated source list 820 may be provided. The manufacturer information may also include identities of content providers such as broadcast networks, video-on-demand (VOD) providers, online streaming services, etc.

In addition, the manufacturer information as well as information on a kind of device may also be provided to the updated source list 820. For example, the update source list 820 may include the manufacturer information and the device type if the image providing apparatus 200 is a set-top box, and may include the device type if the image providing apparatus 200 is Blue-ray player, a digital video recorder (DVR), a home theater system (HTS) apparatus, and may include manufacturer information and a device name in the case in which the image providing apparatus is an over-the-top (OTT) and a game device. The information on the kind of device may be obtained by different schemes depending on the device. For example, the information on the kind of device may be obtained by directly inputting, by the user, the information on the kind of device to the display apparatus 100, or may be obtained by only a connection with the display apparatus 100.

Meanwhile, the apparatus information of the image providing apparatus 200 may be used for the source name update as described above, and may be transmitted to the external server to be collected. Accordingly, the external server may provide a service suitable for the business operator of the image providing apparatus 200 through the display apparatus 100. For example, the external server may provide an EPG corresponding to the business operator of the image providing apparatus 200 to the display apparatus 100. As well, the apparatus information of the image providing apparatus 200 may also be used for a statistic purpose.

Figure 9:
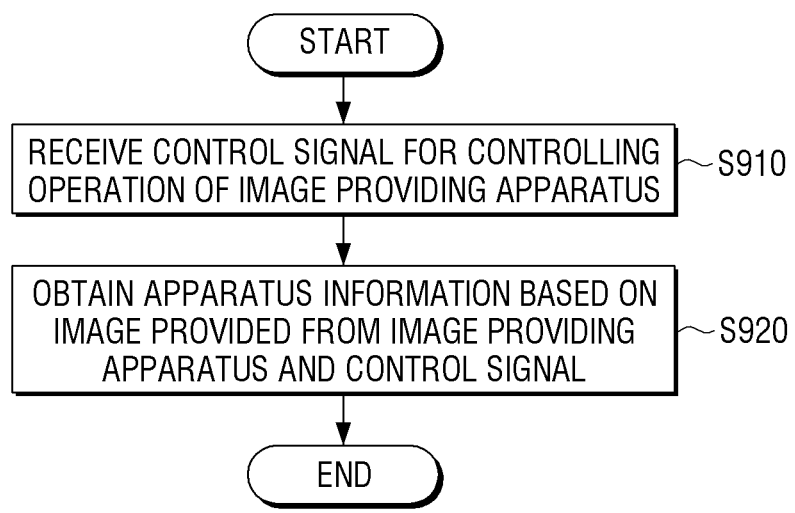
FIG. 9 is a flowchart illustrating a method for controlling a display apparatus according to an exemplary embodiment.

FIG. 9 is a diagram illustrating a method for controlling a display apparatus 100 according to an exemplary embodiment.

In FIG. 9, the display apparatus 100 may receive a control signal for controlling an operation of the image providing apparatus 200 (S910). Such control signal may be an IR signal transmitted from the first remote control 300' capable of controlling the image providing apparatus 200. The display apparatus 100 may receive the IR signal generated to control the image providing apparatus 200 by performing IR sniffing for the IR signal.

In addition, the display apparatus 100 may obtain the apparatus information of the image providing apparatus 200, based on an image provided from the image providing apparatus 200 after receiving the control signal, and the received control signal (S920).

According to an aspect of an exemplary embodiment, the display apparatus 100 may compare the image provided from the image providing apparatus 200 before the first remote control 300' transmits the control signal, and the image provided from the image providing apparatus 200 after the first remote control 300' transmits the control signal, to thereby sense an image change type, and may obtain the apparatus information of the image providing apparatus 200, based on the sensed image change type and the control signal received by the display apparatus 100 from the first remote control 300'.

However, if multiple apparatus candidates are obtained based on the image change type and the control signal, the display apparatus 100 may narrow the choices down to one apparatus based on the contents from which a manufacture of the image providing apparatus 200 may be recognized (e.g., the logo (see FIG. 5) of the image providing apparatus 200, a matching relationship (see FIG. 6) between the channel number and the broadcast logo, and the like), in the image provided from the image providing apparatus 200.

According to an aspect of an exemplary embodiment, the display apparatus 100 may detect contents from which the manufacturer of the image providing apparatus 200 may be detected in the image provided from the image providing apparatus 200, and may select one apparatus from multiple apparatus candidates based on the image change type and the control signal as additionally described in the case in which multiple apparatus candidates are obtained based on the detected contents.

That is, as a method for obtaining, by the display apparatus 100, the apparatus information of the image providing apparatus 200 using the first remote control 300', (1) a method based on the control signal for which the IR sniffing is performed and the image change is sensed, (2) a method for sensing manufacturer-specific content in the image provided from the image providing apparatus 200, or (3) a method for simultaneously performing the method (1) and the method (2) may be used.

Meanwhile, in the methods (1) and (3), because an information obtaining process may be initiated only if the display apparatus 100 performs sniffing for the IR signal, there is an advantage that memory waste may be reduced.

Figure 10:
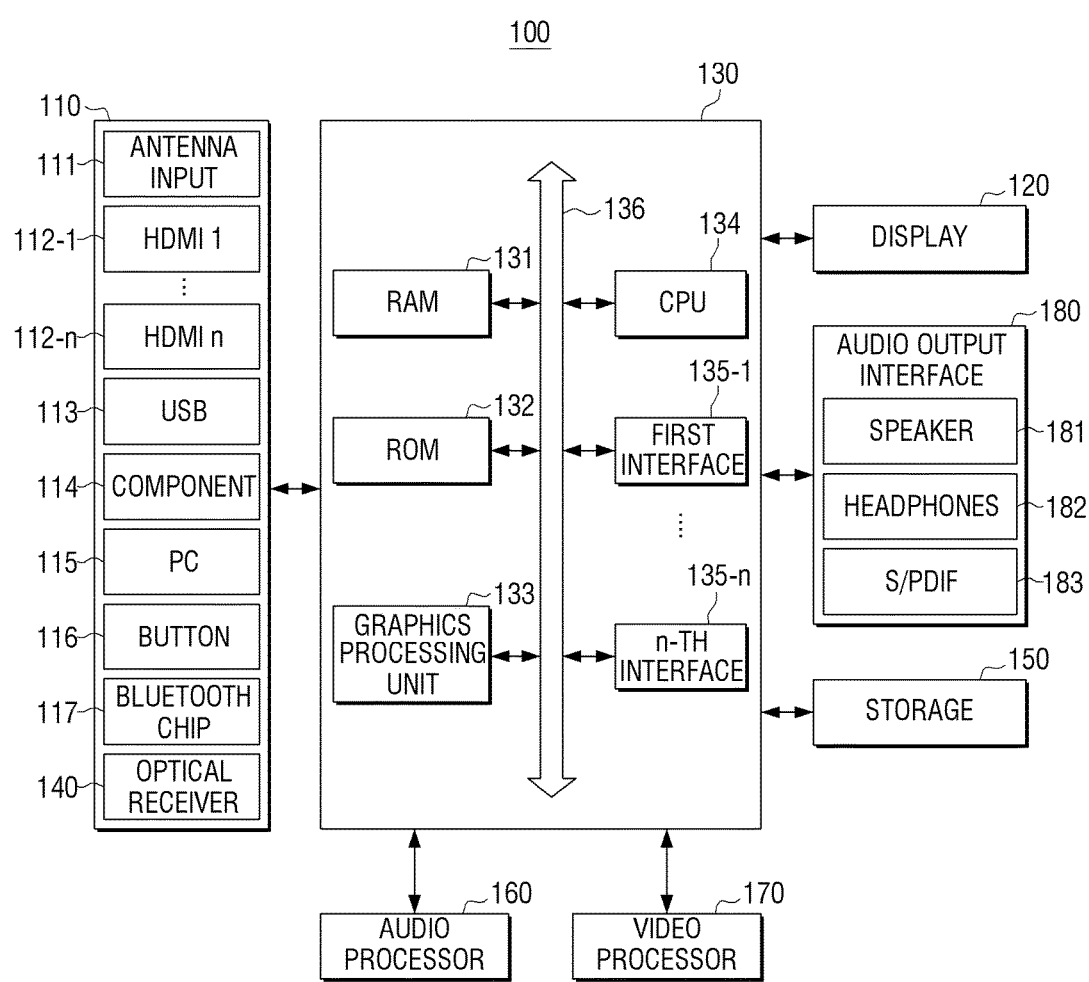
FIG. 10 is a block diagram illustrating a detailed configuration of the display apparatus according to an exemplary embodiment.

FIG. 10 is a block diagram illustrating a detailed configuration of the display apparatus 100 according to an aspect of an exemplary embodiment. The display apparatus 100 may further include components such as an optical receiver 140, a storage 150, an audio processor 160, a video processor 170, and an audio output interface 180, in addition to the communicator 110, the display 120, and the processor 130.

Overlapping descriptions of the same operations as those described above of the operations of the communicator 110, the display 120, and the processor 130 will be omitted.

The communicator 110 may include an antenna input port 111, HDMI input ports 1 to n (112-1 to 112-*n*), a USB port 113, a component input jack 114, a PC input jack 115, a button 116, a Bluetooth chip 117, an optical receiver 140, and the like.

The optical receiver 140 may receive an optical signal such as an IR signal through an optical window. The IR signal received through the optical receiver 140 may be a signal for controlling the display apparatus 100, or may be a signal received by performing IR sniffing for a signal for controlling other apparatuses.

The processor 130 may analyze a waveform of the IR signal received with IR sniffing to thereby identify the IR signal. In addition, the processor 130 may analyze the image received through the communicator 110 to thereby sense a change in the image corresponding to the IR signal, and may detect the sensed image change type to thereby determine the control command corresponding to the IR signal. In addition, the processor 130 may obtain the apparatus information corresponding to the determined control command and the IR signal as the apparatus information of the image providing apparatus 200.

The communicator 110 may include a communication chip such as the Bluetooth chip 117. In addition, the communicator 120 may include various communication chips such as a Wi-Fi chip, an NFC chip, a wireless communication chip, and the like. If the Bluetooth chip 117 is used, the communicator 110 may first transmit and receive a variety of access information such as a service set identifier (SSID), a session key, and the like; perform a communication connection using the variety of access information; and then transmit and receive a variety of information.

The display apparatus 100 may include a tuner for selecting a broadcast channel received through the antenna input port 111.

The processor 130 may transmit a variety of control commands to the remote control 300 through the communicator 110 in the Bluetooth communication scheme. In particular, the processor 130 may transmit the control command including the IR code set to the remote control 300 in the Bluetooth scheme.

The button 116 may be, for example, a power button, a mute button, a volume change button, or a channel change button.

The audio processor 160 may be a component performing processing for audio data. The audio processor 160 may perform various processing tasks such as decoding, amplification, noise filtration, and the like for the audio data.

The video processor 170 may be a component performing processing for the image data received by the communicator 110. The video processor 170 may perform various image processing tasks such as decoding, scaling, noise filtering, frame rate conversion, resolution conversion, and the like for the image data.

The audio output interface 180 may include a speaker 181, a headphones output terminal 182 and/or an Sony/Philips Digital Interface Format (S/PDIF) output terminal 183 for outputting the audio data processed by the audio processor 160.

The storage 150 may store various data, programs or applications for driving and controlling the display apparatus 100 by the control of the processor 130.

The storage 150 may be a non-volatile memory, a volatile memory, a hard disk drive (HDD), or a solid-state drive (SSD). In addition, the storage 150 may be a memory card (e.g., a micro Secure Digital (SD) card, a USB memory) mounted in the display apparatus 100.

The storage 150 may store various modules such as an image processing module, an image recognition module, an IR sniffing module, and the like. In addition, the storage 150 may store a broadcast receiving module, a channel control module, a volume control module, a communication control module, a voice recognition module, a motion recognition module, an optical receiving module, a display control module, an audio control module, an external input control module, and/or a power control module. In addition, the storage 150 may store IR code sets for various manufacturers of the image providing apparatus, manufacturer logos, broadcast network logos, and the like.

The processor 130 may control an overall operation of the display apparatus 100 using a variety of programs stored in the storage 150.

The controller 130 may include a random access memory (RAM) 131, a read-only memory (ROM) 132, a graphics processing unit 133, a central processing unit (CPU) 134, first to n-th interfaces 135-1 to 135-*n*, and a bus 136. Here, the RAM 131, the ROM 132, the graphics processing unit 133, the CPU 134, the first to n-th interfaces 135-1 to 135-*n*, and the like may be connected to each other through the bus 136.

The ROM 132 may store a set of instructions for booting a system, and the like. When a turn-on instruction is input to supply power to the CPU 134, the CPU 134 may copy an operating system (OS) stored in the storage 150 to the RAM 131 according to the instructions stored in the ROM 132, and execute the OS to boot the system. When the booting of the system is completed, the CPU 134 may copy a variety of application programs stored in the storage 150 to the RAM 131, and execute the application programs copied to the RAM 131 to perform a variety of operations.

The graphics processing unit 133 may generate a screen including various objects such as an icon, an image, a text, and the like using a calculator and a renderer. The calculator calculates attribute values such as coordinate values, shapes, sizes, colors, and the like in which the respective objects are to be displayed according to a layout of the screen. The renderer generates the screen of various layouts including the objects based on the attribute values calculated by the calculator. The screen generated by the renderer is displayed in a display region of the display 120.

The first to n-th interfaces 135-1 to 135-*n* are connected to the variety of components described above. One of the interfaces may be a network interface connected to an external device via a network.

For example, the CPU 134 may copy an image analysis module stored in the storage 150 to the RAM 131, and execute the image analysis module. Accordingly, the CPU 134 may analyze the image received from the image providing apparatus 200 to thereby obtain the apparatus information of the image providing apparatus 200.

Meanwhile, various exemplary embodiments described above may be implemented in a recording medium that is readable by a computer or a device similar to the computer using software, hardware, or a combination thereof. With a hardware implementation, the exemplary embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, the exemplary embodiments described in the present specification may be implemented by the processor 130 itself. With a software implementation, exemplary embodiments such as procedures and functions described in the present specification may be implemented by separate software modules. Each of the software modules may perform one or more functions and operations described in the present specification.

Meanwhile, the method for controlling a display apparatus according to various exemplary embodiments described above may be stored in a non-transitory readable medium. The non-transitory readable medium described above may be mounted in various apparatuses to be used.

The non-transitory computer readable medium does not mean a medium storing data for a short period such as a register, a cache, a memory, or the like, but means a machine-readable medium semi-permanently storing the data. Specifically, the programs for performing various methods described above may be provided to be stored in the non-transitory computer readable medium such as a compact disc (CD), a digital versatile disc (DVD), a hard disk, a Blu-ray disc, a universal serial bus (USB), a memory card, a read-only memory (ROM), or the like.

Although the exemplary embodiments have been illustrated and described hereinabove, the present disclosure is not limited to the above-mentioned specific exemplary embodiments, but may be variously modified by those skilled in the art to which the present disclosure pertains without departing from the scope and spirit of the present disclosure as claimed in the accompanying claims. These modifications should also be understood to fall within the scope of the present disclosure.

What is claimed is:

1. A display system comprising:
a display apparatus configured to display a first image;
an image providing apparatus configured to provide a second image based on receiving a control signal for controlling the image providing apparatus;
a first remote control configured to transmit the control signal for controlling the image providing apparatus; and
a second remote control,
wherein the display apparatus is further configured to:
receive the control signal for controlling the image providing apparatus, from the first remote control, and the second image, responsive to the control signal, from the image providing apparatus,
display the received second image,
identify a predetermined object in the second image by comparing the first image with the second image,
obtain apparatus information of the image providing apparatus based on the control signal received from the first remote control and a change status of the identified predetermined object, and
transmit the apparatus information to the second remote control, and
wherein the apparatus information comprises a control code set corresponding to the image providing apparatus.

2. A display apparatus comprising:
a communicator;
a display; and
a processor configured to:
control the display to display a first image received from an image providing apparatus,
receive, through the communicator, a control signal for controlling the image providing apparatus from a first remote control, and a second image, responsive to the control signal, from the image providing apparatus, and
control the display to display the second image,
identify a predetermined object in the second image by comparing the first image with the second image,
obtain apparatus information of the image providing apparatus based on the control signal received from the first remote control and a change status of the identified predetermined object, and
control the communicator to transmit the apparatus information to a second remote control,
wherein the apparatus information comprises a control code set corresponding to the image providing apparatus.

3. The display apparatus as claimed in claim 2, wherein the processor is further configured to:
compare the first image received by the communicator from the image providing apparatus before the communicator receives the control signal with the second image received by the communicator from the image providing apparatus after the communicator receives the control signal to identify a control command corresponding to the control signal, and
obtain the apparatus information of the image providing apparatus based on the identified control command and the control signal.

4. The display apparatus as claimed in claim 3, wherein the processor is further configured to control the communicator to transmit the identified control command and the control signal to a server, and receive the apparatus information of the image providing apparatus from the server.

5. The display apparatus as claimed in claim 2, wherein the processor is further configured to obtain a logo in the second image provided by the image providing apparatus to obtain the apparatus information of the image providing apparatus.

6. The display apparatus as claimed in claim 2, wherein the processor is further configured to, based on sensing a connection with the image providing apparatus and the communicator receiving the control signal for controlling the image providing apparatus, obtain the apparatus information of the image providing apparatus.

7. The display apparatus as claimed in claim 2, wherein the processor is further configured to update a source name of the image providing apparatus based on the obtained apparatus information.

8. The display apparatus as claimed in claim 7, wherein the processor is further configured to control the display to display a source list comprising the updated source name.

9. A method for controlling a display apparatus, the method comprising:

displaying a first image received from an image providing apparatus;

receiving, by the display apparatus, a control signal for controlling the image providing apparatus, from a first remote control, and a second image, responsive to the control signal, from the image providing apparatus;

displaying the received second image;

identifying a predetermined object in the second image by comparing the first image with the second image;

obtaining apparatus information of the image providing apparatus based on the control signal received from the first remote control and a change status of the identified predetermined object; and transmitting the apparatus information to a second remote control, wherein the apparatus information comprises a control code set corresponding to the image providing apparatus.

10. The method as claimed in claim 9, wherein the obtaining the apparatus information of the image providing apparatus comprises:

comparing the first image received before receiving the control signal with the second image received after receiving the control signal to identify a control command corresponding to the control signal, and obtaining the apparatus information of the image providing apparatus based on the identified control command and the control signal.

11. The method as claimed in claim 10, wherein the obtaining the apparatus information of the image providing apparatus comprises:

transmitting the identified control command and the control signal to a server, and receiving the apparatus information of the image providing apparatus from the server.

12. The method as claimed in claim 9, wherein the obtaining the apparatus information of the image providing apparatus comprises obtaining a logo in the second image provided from the image providing apparatus to obtain the apparatus information of the image providing apparatus.

13. The method as claimed in claim 9, wherein the obtaining the apparatus information of the image providing apparatus comprises, based on discovering a connection with the image providing apparatus and receiving the control signal for controlling the image providing apparatus, obtaining the apparatus information of the image providing apparatus.

14. The method as claimed in claim 9, further comprising updating a source name of the image providing apparatus using the obtained apparatus information.

15. The method as claimed in claim 14, further comprising displaying a source list comprising the updated source name.

* * * * *